United States Patent [19]

Robbins

[11] Patent Number: 4,598,318
[45] Date of Patent: Jul. 1, 1986

[54] VIDEO ENCRYPTION SYSTEM
[75] Inventor: Clyde N. Robbins, Fort Washington, Pa.
[73] Assignee: General Instrument Corporation, New York, N.Y.
[21] Appl. No.: 502,958
[22] Filed: Jun. 10, 1983
[51] Int. Cl.⁴ .......................... H04N 7/167; H04N 5/53
[52] U.S. Cl. .................................. 358/124; 358/114; 358/178
[58] Field of Search ............... 358/114, 124, 171, 172, 358/178

[56] References Cited

U.S. PATENT DOCUMENTS

| | | | |
|---|---|---|---|
| 3,824,332 | 7/1974 | Horowitz | 358/124 |
| 3,835,248 | 9/1974 | Harford | 358/178 |
| 3,985,954 | 10/1976 | Kuniyoshi et al. | 358/171 |
| 4,318,126 | 3/1982 | Sassler | 358/141 |
| 4,369,466 | 1/1983 | Matsuzaki et al. | 358/171 |
| 4,396,947 | 8/1983 | Cheung | 358/124 |

*Primary Examiner*—Stephen C. Buczinski
*Assistant Examiner*—Linda J. Wallace
*Attorney, Agent, or Firm*—Hopgood, Calimafde, Kalil, Blaustein & Judlowe

[57] ABSTRACT

An encrypted video distribution system includes a signal-originating head end for scrambling outgoing television program-bearing signals. In particular, the video content of selected lines is inverted about a reference voltage level, and the inversion reference level amplitude transmitted in pulse form during the horizontal synchronizing pulse interval. Line video inversion/non-inversion is controlled by a keyed pseudo random generator.

At each authorized subscriber location, all inverted lines are restored to proper format, using the accompanying received inversion amplitude level present during horizontal sync as a reference. A pseudo random generator is included in the receiver descrambling circuitry and operates in a sequence identical to the like circuit at the head end to identify those lines requiring video inversion.

20 Claims, 6 Drawing Figures

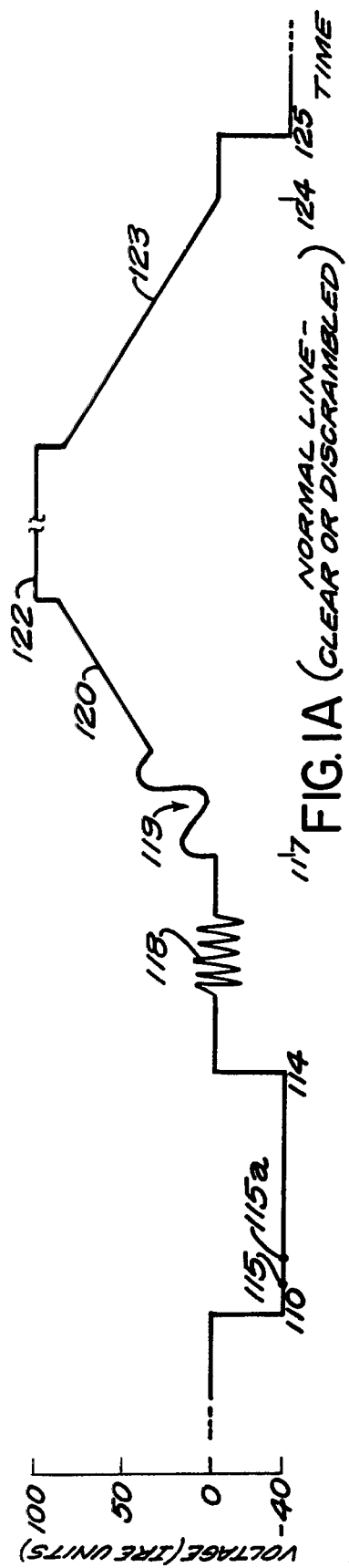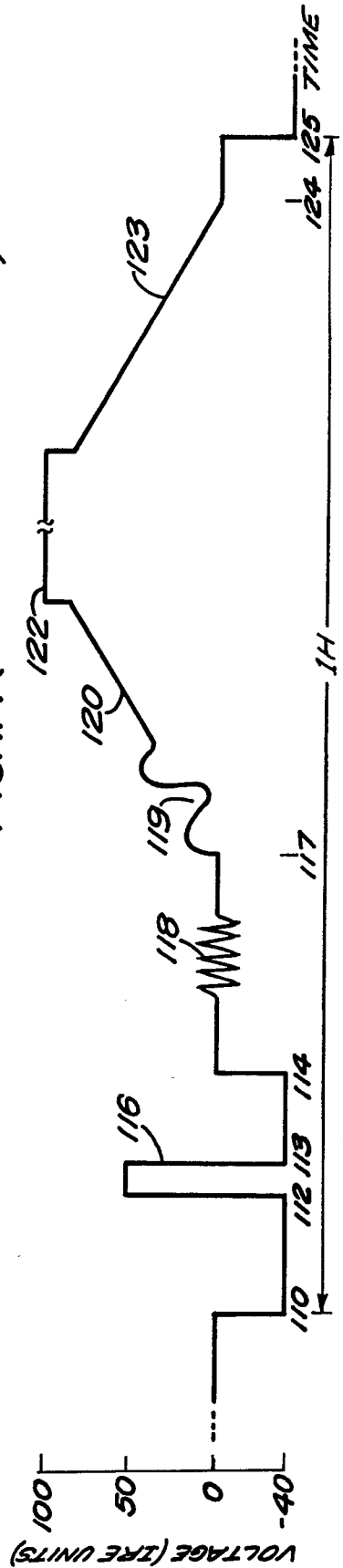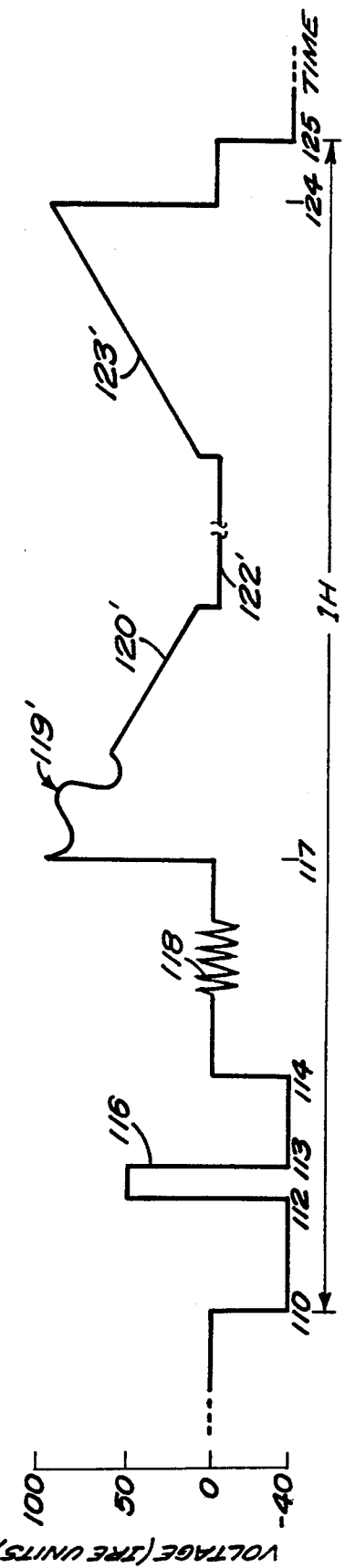

VIDEO ENCRYPTION SYSTEM

DISCLOSURE OF THE INVENTION

This invention relates to video signal distribution systems and, more specifically, to video signal transmission/distribution systems characterized by signal security, permitting reception of scrambled television programming only by authorized recipients.

It is an object of the present invention to provide improved encrypted television signal distribution apparatus.

More specifically, it is an object of the present invention to provide a secure signal distribution system for restricting reception to encrypted (scrambled) premium television programming—as to subscribers in a pay television environment.

The above and other objects of the present invention are realized in a specific, illustrative encrypted video distribution system which includes a signal-originating head end for scrambling outgoing television program-bearing signals. In particular, the video content of selected lines is inverted about a reference voltage level, and the inversion reference level amplitude transmitted in pulse form during the horizontal synchronizing pulse interval. Line video inversion/non-inversion is controlled by a preset pseudo random generator advanced at the line rate.

At each authorized subscriber location, all inverted lines are restored to proper format, using the accompanying received inversion amplitude level present during horizontal sync as a reference. A pseudo random generator is included in the receiver descrambling circuitry and operates in a sequence identical to the like circuit at the head end to identify those lines requiring video inversion.

The above and other features and advantages of the present invention will become more clear from the following detailed description of a specific, illustrative embodiment thereof presented hereinbelow in conjunction with the accompanying drawings in which:

FIG. 1A is a wave form showing one television signal line at base band in conventional format;

FIG. 1B is a wave form depicting a line of video bearing the same intelligence of the FIG. 1A wave on a non-inverted basis in accordance with the principles of the present invention;

FIG. 1C is a wave form depicting an inverted line of video utilizing the principles of the present invention;

Figure 2:
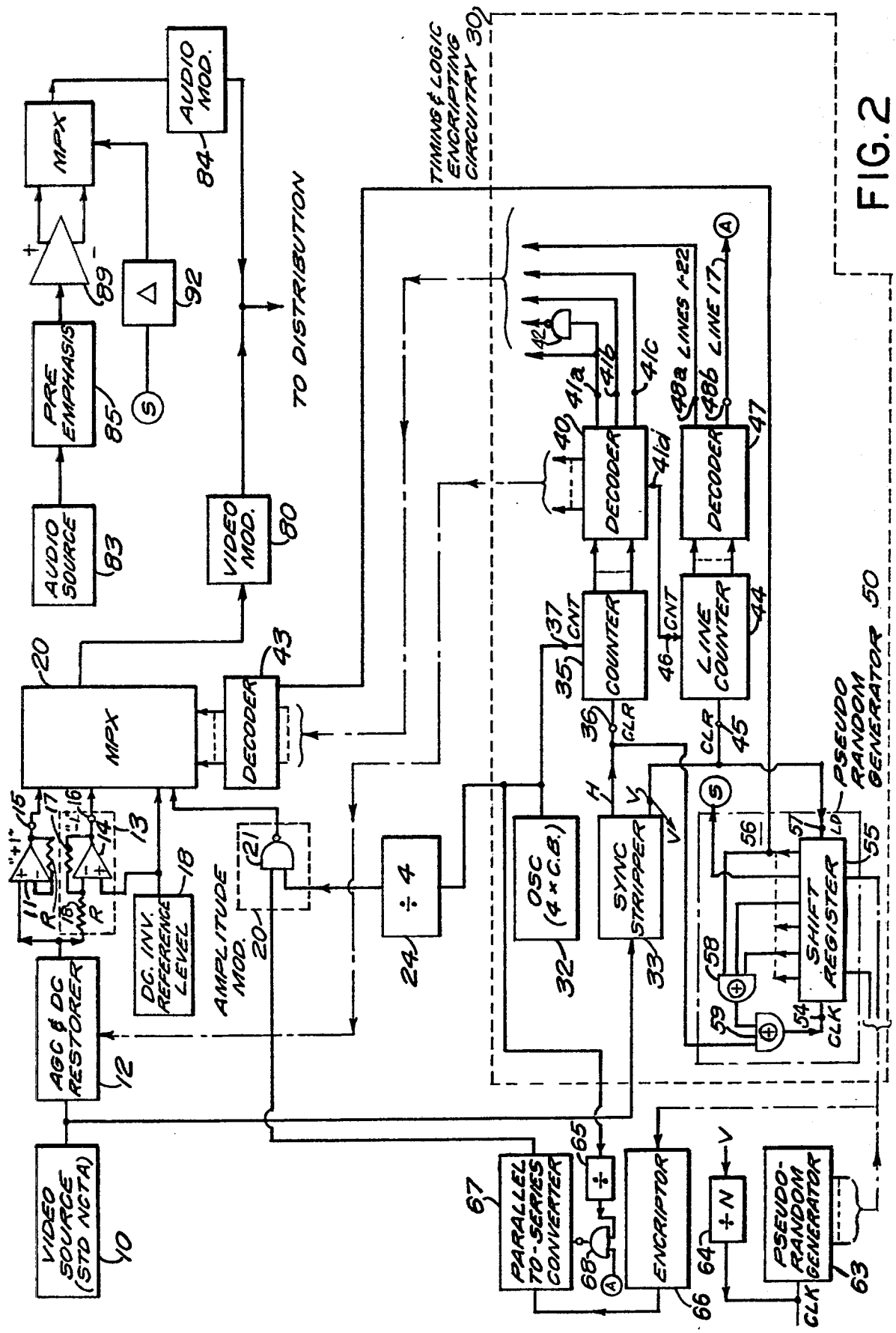
FIG. 2 is a block diagram illustrating signal encoding (scrambling) head end or transmitting station apparatus.

Referring now to FIG. 1A, there is shown an illustrative line of video information which may typically be included as one of a sequence of lines in a video field. The line begins with a horizontal synchronizing pulse which occurs during the period 110–114. The horizontal synchronization level is the lowest amplitude voltage point during the line. By NTSC standard or convention, horizontal sync may be expressed as −40 IRE units, where the signal level varies from the −40 amplitude during the synchronizing intervals to a maximum of +100 IRE units (corresponding to an extreme white picture content). Following the end of the horizontal sync pulse at time 114 (so-called horizontal sync back porch), a burst of color subcarrier 118 is present (at color burst frequency 3.58 mHz). There follows during interval 117–125 an arbitrary pattern of video information—in the case illustrated 1½ cycles of a sinusoid 119 superimposed upon a dark to bright internal ramp 120 peaking at white level 122 finally terminating in a linear bright to dark transition 123. The video content of each line will of course vary in actual practice in accordance with the particular image portion being represented.

In accordance with the principles of the present invention below discussed, video encryption is effected by selectively inverting the video information about a level intermediate the black level (0 IRE) and the bright level peak (+100 IRE), e.g., about +50 IRE. Again, for purposes below discussed a pulse 116 is included in the horizontal synchronization interval having an amplitude corresponding to the DC inversion level (assumed for illustrative purposes only to be +50 IRE as above noted).

FIG. 1B depicts a line of video information where the video has not been inverted and thus the information content of the line following color burst 118 identically corresponds to that of the normal or conventional line depicted in FIG. 1A. The FIG. 1B line of the instant invention differs from the normal line only by including the inversion level pulse 116 during the horizontal synchronization interval 110–114, as between the times 112 and 113.

FIG. 1C illustrates a video line corresponding to the normal or clear line of FIG. 1A—but where video information has been inverted about the +50 IRE. The inverted line is the same as the non-inverted line through the horizontal interval including the horizontal pulse back porch (video information period 117–125), bearing the color burst sinusoid 118. However, following the horizontal pulse back porch (video information period 117–125), all of the video information is inverted about the +50 level. For example, the beginning of the video information (the inception of sinusoid 119) begins at the +100 white level rather than at the 0 black level of FIG. 1B. Some reflection will show that the shape and levels of the remainder of the video wave represent the mirror image of the clear or normal video reflected about the +50-opted inversion level. Corresponding video signal portions are indicated in FIG. 1C with the same reference numerals as employed in FIGS. 1A or 1B but bear a primed notation.

At a conventional receiver not equipped with decrypting apparatus, the video information content of each line will sometimes be inverted and sometimes not. Accordingly, visual impact of such a received transmission as integrated by the eye over several frame traces will be a totally obviated image. Indeed, the image on an integrated basis throughout the picture will appear as a flat field of +50 IRE intensity.

This reception-inhibition exists where no other encryption is employed. In accordance with one aspect of the instant invention, however, the inverted/non-inverted wave above described may be subject to sync interval amplitude suppression as is per se well known to further inhibit signal reception by unauthorized equipment. Of course where such sync suppression is employed, receiver apparatus is furnished with the per se well known equipment to recover synchronizing information and to effect the inverse of the sync interval amplitude reduction effected at the signal originating head end or transmitter.

Many ways will be apparent to those skilled in the art to communicate line inversion information to system receivers such that inverted lines, and only inverted lines, will be reinverted and thus restored to proper format. Such inversion may be done on a predetermined basis—as by simply counting lines in a field. In accordance with a further aspect of the present invention which will become more clear from the following, however, identically sequencing pseudo random generators are employed at both the signal encrypting and decrypting locations to control the line video inverting/non-inverting pattern to increase video security.

With the above overview of system functioning in mind, attention will now be directed to FIG. 2 which discloses video encrypting (selective line inverting) apparatus to effect the mode of encrypting above-described with respect to FIGS. 1A–1C. A video source 10 supplies video information in conventional (standard NTSC) format to an automatic gain control and D.C. restore circuit 12, and to a sync stripper 33. The video source 10 may comprise any base band video source well known to those skilled in the art, e.g., a video camera, tape recorder, microwave or satellite transmission demodulated to base band, or the like. The AGC and DC restorer 12 is not absolutely necessary—but is per se well known circuitry typically utilized to provide video signal clean up and assurance that voltage levels are of transmission accuracy and quality if not already of such fidelity.

The video information is supplied to a unity ("+1") gain amplifier 11 which provides non-inverted video (i.e., the conventional NTSC signal of FIG. 1A) at an output port 15. The video signal is also supplied to a unity gain inverting ("−1") amplifier 13 which provides inverted video at an output port 16 (e.g., provides the video portion of FIG. 1C during the 117–125 interval). A DC inversion reference level source 18 (the assumed DC level +50 IRE) is supplied as a second input to the inverting amplifier 13. Many forms of amplifiers to effect the above will be readily apparent to those skilled in the art— for example the per se well known operational amplifier configurations depicted. The unity gain amplifier 11 is employed to keep the relation phasings of the inverting and non-inverting transmission channels substantially equal.

The inverted and non-inverted video signals from amplifiers 11 and 14 are supplied as inputs to a multiplexer 20 as is the DC inverting reference level supplied by source 18. Further supplied to the multiplexer 20 is a signal at the color burst frequency (generated by dividing the frequency of an oscillator 32 which is at four times the color burst frequency by a factor of four in a divider 24). The color burst is amplitude modulated in a modulator 20 with a decrypting shift key, as in a NAND logic gate 21, during some predetermined time, e.g., during line 17 which occurs during the vertical interval. The multiplexer 20 selects among its four inputs to supply to a video modulator 80 the desired signal components to construct the outgoing wave in accordance with the selection control effected by a decoder 43. Thus, for example, to construct the encoded but non-inverted line of FIG. 1B, the non-inverted output of amplifier port 15 is passed by multiplexer 20 to the video modulator 80 during the horizontal synchronizing pulse interval and color burst-bearing back porch (period 110–114) except for the time 112–113 when the multiplexer under control of the decoder passes the DC reference level from source 18 to the modulator 80. Because no inversion is to occur, the video signal from the non-inverting port 15 is coupled to modulator 80 during the video information interval 117–124. The inverted video line (e.g., FIG. 1C) is similarly constructed, except that the output of the inverting port 16 is selected by multiplexer 20 for delivery to video modulator 80 during the information content portion (114–125) of the video wave.

The sequence of successive video lines with inverted or non-inverted video content as appropriate are raised to the desired outgoing radio frequency by modulator 80 and impressed upon any distribution medium, e.g., an antenna for radiation or a cable for a CATV or MATV environment. Also generated for distribution is the audio content for the television program, supplied by an audio source 83 and processed by a modulator 84.

The remaining structure of FIG. 2 generates the control information for the multiplexer 20 and otherwise participates in the encoding process. Principally employed is a timing and logic circuit 30 which includes counters 35 and 44 and counter output state decoders 40 and 47 for subdividing an overall image period between vertical synchronizing pulses into predetermined time slots for effecting requisite functions required during the respective decoded time periods. The cascaded counters 35 and 44 and decoders 40 and 47 are per se well known to those skilled in the art and, indeed, are obtainable in integrated circuit form. Similarly, the use of cascaded counters and decoders to subdivide time under control of an input time base oscillator for signal subdivision and control is per se well known to those skilled in the art. All decoders of the instant invention may be combinatorial logic circuits or, alternatively, memories which store the desired decoding pattern.

The sync stripper 33 supplies a pulse each horizontal synchronizing interval ("H" output port) and a pulse during each vertical synchronizing interval ("V" output port). The horizontal sync pulses are supplied to a clear input 36 of counter 35 to clear or restart the counter decoder 35–40 from its initial state at the beginning of each line. The counter 35 is thereafter rapidly advanced at the multiple of the color burst rate as the oscillator 32 supplies pulses to the counting input 37 of counter 35. The outputs of counter 35 are supplied as inputs to the decoder 40 which provides pulses at a number of output ports to indicate the occurrence of various time intervals during each line as the counter 35 is monotonically advanced from its initially cleared state.

The line counter 44 is cleared at a clear input 45 by each vertical synchronizing pulse and is thereafter advanced at its count input port 46 as each video line is encountered (via output port 41d of the line subdivision decoder 40). Decoder 47 supplies output information indicating the incidence of particular lines within the interval between vertical synchronizing pulses for which certain system functions are required. The ensemble of outputs 48 from decoder 47 and 41a–41c from decoder 40 are supplied as inputs to the multiplexer 20-controlling decoder to control the multiplexer 20 as it generates the desired output information. More specifically, the decoder 40 supplies at output port 41a a signal indicating the occurrence of the horizontal pulse interval (time 110–114 in FIGS. 1A–1C). An inverter 42 is utilized to communicate to the decoder the inverse of the port 41a signal, i.e., that portion of a line other than the horizontal sync pulse. The decoder 40 supplies a signal at output port 42b indicating the occurrence of the time 112-113 during each line when the multiplexer 20 must select the DC inversion reference level (please see FIGS. 1B and 1C). The decoder 40 output port 41c communicates to multiplexer 20-controlling decoder 43 the interval when the color burst 118 is to be passed to the video modulator 80.

Continuing with the controlling inputs for the multiplexer 20, output port 48a of decoder 47 signals the incidence of lines (e.g., 1 through 22) of the vertical interval when no inversion is to occur. The remaining output 48b shown identifies line 17 so that a higher order decrypting key is modulated onto the color burst output of divider 24. Again, decoder 43 may be any combinatorial circuit for constraining the multiplexer 20 to pass the desired one of its four inputs to the video modulator 80 depending upon the Boolean values of the plurality of signals at its input control port.

In accordance with one aspect of the present invention, the line inversion/non-inversion process is governed by a pseudo random generator 50 which may be of any well known construction, e.g., a shift register 52 with selected stage outputs being coupled by exclusive OR logic 58 and 59 to the shift register clock input 54. Such a shift register/exclusive OR logic combination is a per se known structure for generating a unique, predetermined binary sequence. The pseudo random generator 50 is supplied at its preset input port 55 with a binary word by the output of a second pseudo random generator 63. At each vertical synchronizing interval the vertical sync pulse is applied to a preset load shift register port 53 such that the shift register 52 is initialized following each vertical retrace interval to a state governed by the output of the second pseudo random generator 63. Accordingly, the particular binary sequence emanating from the pseudo random generator 50 - which corresponds to the video line inversion pattern, develops as the shift register 52 receives a clock input during each line following the vertical sync pulse and depends upon the output of the random generator 63. The generator 63 thus changes the line inversion/non-inversion pattern and controls encoding and decoding of the system. Accordingly, subscribers with illicit FIG. 3 receiver equipment, but who do not have access to the ongoing changing pattern of the pseudo random generator 63, cannot receive encoded video. The pseudo random generator 63 is clocked (and thus changes the line inversion pattern) by dividing down vertical synchronizing pulses such that the random generator encrypting pattern changes every few fields or the like. Other strategies as well may be employed to vary the output of generator 63. The pseudo random generator 63 may be implemented by any known construction, e.g., that shown in detail for the generator 50.

The output state of generator 63 is operationally passed through an encrypter 66 (e.g., a combinatorial or sequential logic circuit having a fixed or changeable encryption (signal varying) algorithm) which further scrambles the decrypting key, passes through a parallel-to-series converter 67 and is supplied as an input to the color burst modulating NAND gate 21. Clocking for the parallel-to-series converter (e.g., a shift register) is derived from the oscillator 32 via a divider 65 and a coincidence gate 68 enabled during the appropriate (e.,g., line 17) time by output 48b of line decoder 47. Thus, the encrypting key needed for decrypting at the subscriber terminal is communicated via amplitude modulation on the color burst subcarrier during the predetermined line 17 period.

Thus, the FIG. 2 scrambling/encoding apparatus selectively inverts the video information on a line by line basis in a pseudo random pattern with a hierarchy of encrypting keys generating a signal which cannot be recovered by a conventional television receiver—and, indeed, cannot be recovered by even apparatus of the instant invention without continuing access to the encryption pattern then invoked by the encrypter 66.

Figure 3:
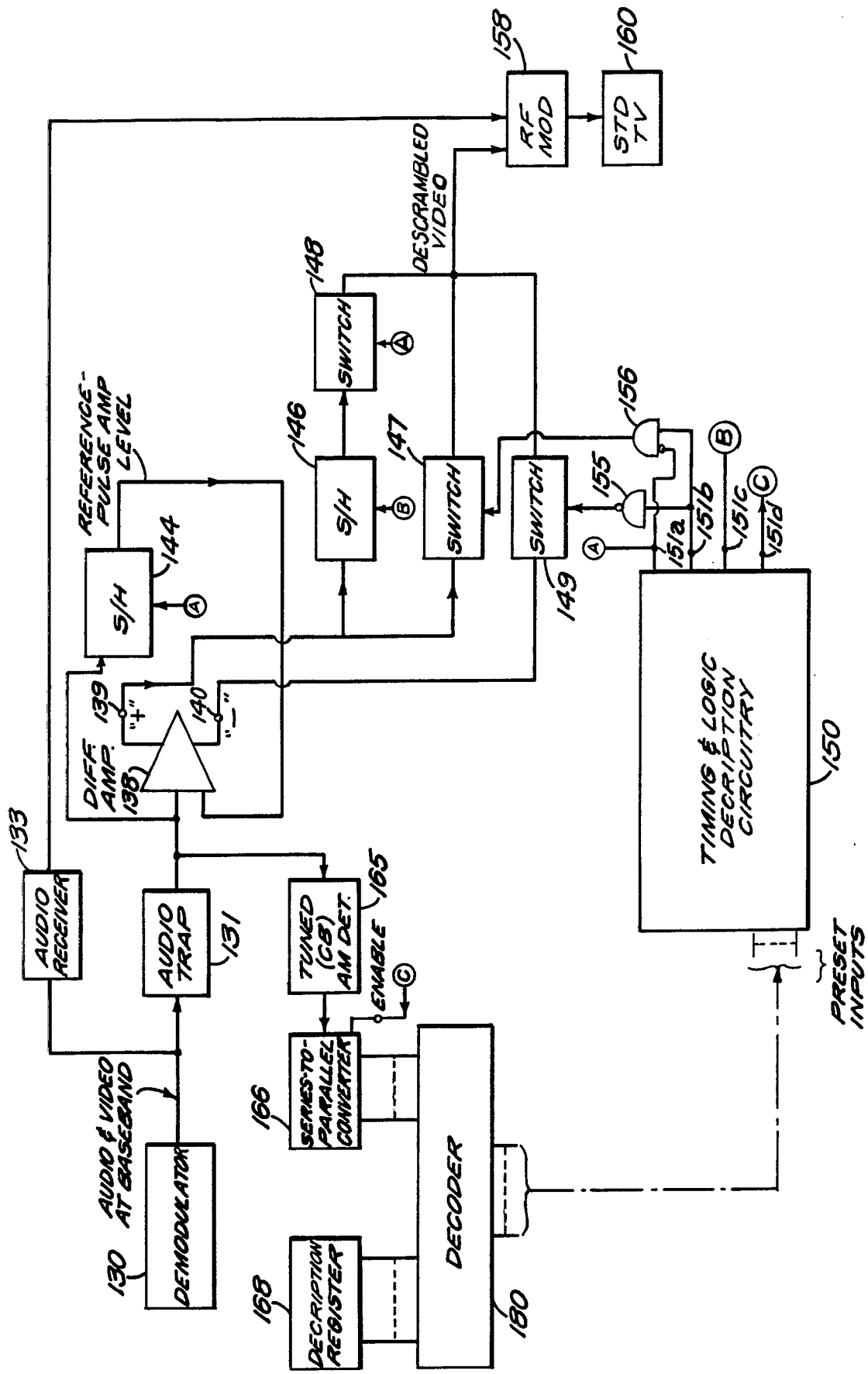
FIG. 3 is a block diagram schematically illustrating signal decrypting, receiver apparatus operable to recover transmissions encoded by the FIG. 2 structure.
Figure 4:
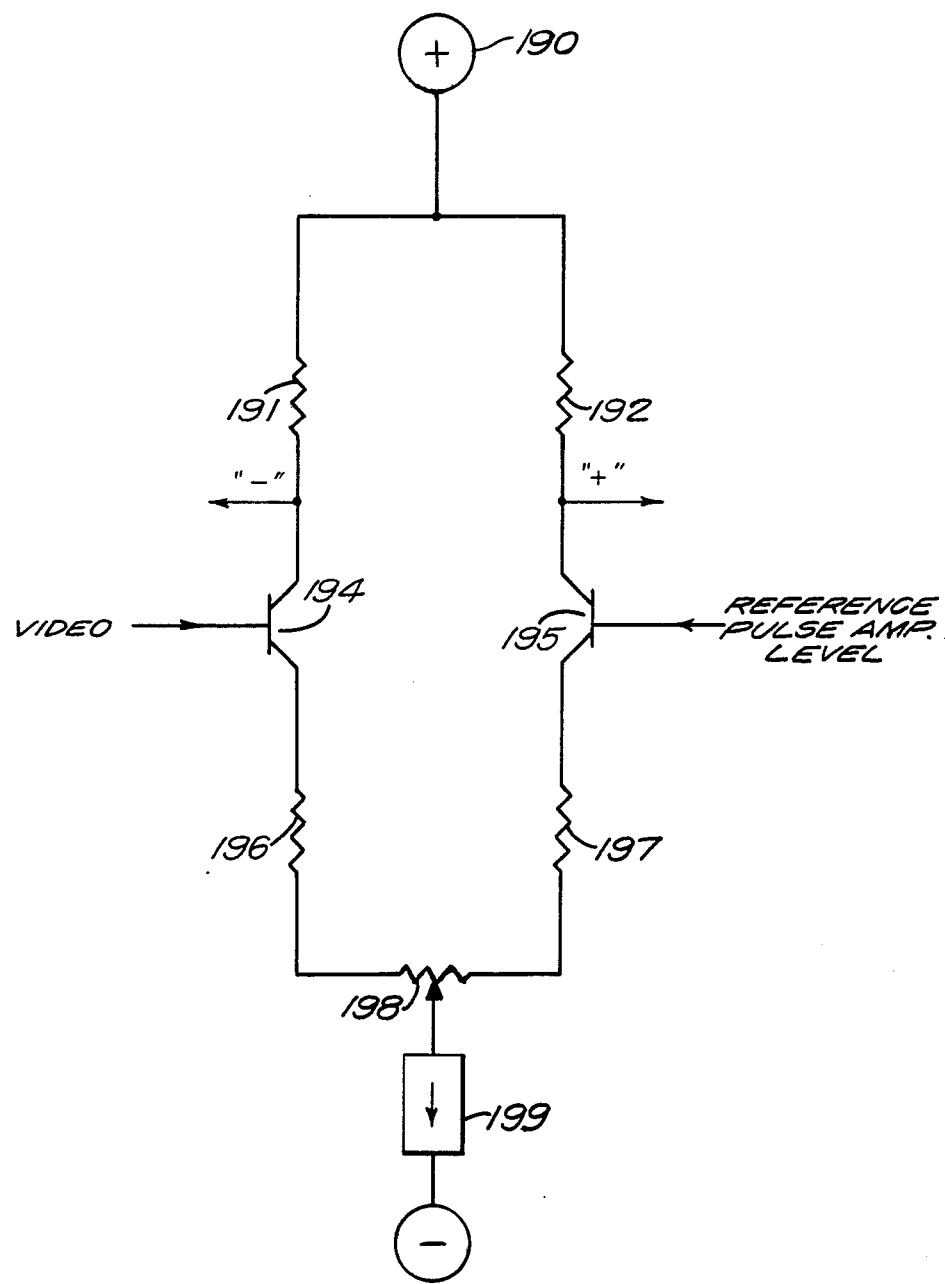
FIG. 4 is a schematic diagram illustrating a favored form of difference amplifier for the instant invention.

Turning now to FIG. 3, there is shown receiving apparatus for receiving and reconstituting the television information image supplied by the video source 10 at the transmitter. A demodulator 130 recovers the incoming radio frequency wave and demodulates it to base band. A following audio trap 131 eliminates the sound subcarrier, with sound being detected by an audio receiver 133. The base band video (the inverted and non-inverted sequence of lines) is passed to one input of a difference amplifier 133. The amplifier 138 (one form of which is schematically shown in FIG. 4 and discussed below) generates at a non-inverting "+" output 139 the line as received. The amplifier 138 also generates and supplies the received line but having video information inverted around the nominal +50 IRE amplitude at an inverting, "−" output port 140.

Because the actual amplitude levels in the received wave may differ somewhat from the DC voltage levels when the encryption was actually generated, the inversion when required is made not about a fixed +50 IRE value but, rather, about the received amplitude of the inversion level pulse (116—FIGS. 1B and 1C) occurring during the associated horizontal sync interval. To this end, timing and logic decription circuitry 150 directly analogous to the circuitry 30 at the head end (FIG. 2) generates an output signal at an output port 151a at times corresponding to the period 112-113 in FIGS. 1B and 1C. This timing pulse "A" activates a sample and hold circuit 144 to operate in a sampling mode during the interval such that the received level of the pulse 116 is stored for the remainder of the line at the output of the circuit 144 and is communicated to one input of the difference amplifier 138. Accordingly, video information at the inverting output port 140 is a measure of the difference between the received video and the received amplitude of the pulse 116 which undergoes proportional signal variance, if any, with the video intelligence and is not a strict difference vis-a-vis the absolute +50 IRE level to the extent that the received pulse amplitude in fact differs from that level. Accordingly, the signals at the amplifier 138 output ports 139 and 140 represent non-inverted and restored-reinverted outputs which reduce descrambling errors to very palatable, virtually indiscernable levels. The non-inverted and inverted video signals are supplied to video switches 147 and 149, respectively. The video switches may be implemented by any per se well known device, e.g., a controlled FET switch.

As was the case at the transmitter, timing and logic decryption circuitry 150 generates the necessary timing to permit system decription. The output at port 151b comprises the line-by-line invert/non-invert signal comparable to the output of pseudo random generator 50 as supplied to decoder 43 in FIG. 2 during the encoding process. An inverter 155 inverts the "non-inverted" output of port 151b to actuate the switch 149 when a line was in fact inverted at the transmitter/head end thus operatively selecting the reinverted output 140 for passage to an RF modulator 158. Correspondingly, the enabling "non-inverted"-signalling output at port 151b passes through an AND gate 156 to actuate switch 147 to select the non-inverted output of difference amplifier 138 port 139 when the line has not been inverted. The selected output of switch 147 or 149 becomes the operative video base band modulation corresponding to that obtaining at the original video source 10. This base band signal is passed to radio frequency modulator 158 to raise the frequency to a standard television channel and is then supplied to a standard television set 160 for viewing.

The timing circuitry output 151a is coupled to an inverting, AND 156 gate blocking input to block the non-invert signals during the period between times 112-113 to suppress the inversion level pulses 116 which do not form part of the conventional television signal and which are not to be passed to the modulator 158 or receiver 160. Further in this regard, a sample and hold circuit 146 is enabled by port 151c of timing logic 150 to sample the normal horizontal sync level, e.g., during the interval 115-115a of FIG. 1A prior to the pulse 116. This level is then passed through switch 148 which is actuated during the pulse 116 interval 112-113 such that the RF modulator 158 receives the horizontal sync voltage (the actual level corresponding to the nominal −40 IRE value) during the interval 112-113. Accordingly, the descrambled video input to the RF modulator 158 identically correspond to the standard video signal of FIG. 1A which has been fully reconstituted. The RF modulator 158 is also supplied with the audio program from audio receiver 133.

As above noted, the timing and logic decryption circuitry 150 essentially corresponds to the circuitry 30 of FIG. 2 and in particular employs a pseudo random generator identical to the generator 50 specifically shown in FIG. 2 and which operates in synchronization therewith to develop for receiver decryption the same inversion/non-inversion pattern as was used for encryption at the transmitter. To this end, the preset inputs 55 of the shift register 52 in circuitry 150 is supplied with the same digital pattern as existed at the output of pseudo random generator 63 at the head end. To effect this, an AM detector 165 tuned to the amplitude modulated color burst supplied by modulator 20 at the transmitter decodes the encrypting intelligence impressed on the color burst during line 17 at the transmitter. The output of AM detector 165 is converted from series-to-parallel form in a converter 166, enabled during line 17 via circuit 150 port 151d, with the converter output being supplied as inputs to a decoder 180. Also supplied to the decoder 180 is the remaining decryption key—required to effect the inverse of the encryption effected in encrypter 66 at the transmitter/head end, which is stored in a register 168. The register 168 may be a manually loaded memory (e.g., thumb wheel switches) or, preferably, may be loaded via any communications channel either in band or out of band. The decoder 180 operates on the Boolean inputs supplied thereto by the circuit elements 166 and 168 to generate the same preset signals as obtained at the output of pseudo random generator 63 at the transmitter. Again, decoder 180 may simply comprise combinatorial logic circuitry or a ROM or other memory.

Thus, the FIG. 3 arrangement employs timing circuitry 150 which generates at an output port 151b the same sequence of inversion/non-inversion signals as obtained at the output of transmitter pseudo random generator 50. This control signal is then used to select between the video information as received (non-inversion video at amplifier output 139) or to select the reinverted received signal (amplifier output 140) by actuating the appropriate switch 147 or 149. The reference inversion pulse 116 is suppressed after it has served its function at the receiver by blocking both switches 147 and 149 during the period 112-113 and employing the sample and hold circuit 146 and actuated switch 148 to replace the pulse with horizontal synchronizing pulse level voltage during that 112-113 interval.

Finally, FIG. 4 shows a particularly advantageous implementation of difference amplifier structure usable for the amplifier 138 (FIG. 3) of the instant invention. The circuit employs transistors 194 and 195 having resistors 196, 198 and 197 connected between their emitters, and equal collector circuit resistors 191 and 192. The resistor 198 is a potentiometer having its center tap connected to a negative voltage via a current source 199, e.g., a transistor having a fixed base voltage and a series emitter resistor. The video information is supplied to the base of one transistor, e.g., the device 194, while the reference inversion voltage is supplied to the base of the other transistor. The non-inverting voltage is taken at the collector of the transistor (195) having its base driven between inversion DC level, while the inverted level is taken from the transistor having its base supplied with the line video information. By matching values for the resistors 191 and 192 and assuming the transistors have a very substantial gain, the gain of the amplifier for both inverting and non-inverting outputs is essentially given by the quotient of the collector resistance divided by the sum of the emitter-to-emitter three series resistors 196–198. Moreover, the two outputs are 180° out of phase, and both the gain and the phase criteria obtain over a wide frequency range from DC through the video range. The matched gain and phase for the reinverting and non-inverting signal paths of the instant invention, and communication path linearity, are important since a signal undergoing inversion at the head end and reinverted restoration at the receiver must be substantially equal to its sometimes non-inverted replica to avoid image distortion.

In summary then the apparatus of the instant invention provides a secure system for transmitting video information which may be receivable only by subscribers having equipment to duplicate the inversion/non-inversion encripting pattern, and which contain structure responsive to the inverted/non-inverted control mandates to selectively restore scrambled lines to a format viewable by a standard television receiver.

The above-described arrangement is merely illustrative of the principles of the present invention. Numerous modifications and adaptations thereof will be readily apparent to those skilled in the art without departing from the spirit and scope of the present invention.

What is claimed is:

1. In combination in a scrambled composite video signal distribution system; signal originating encrypting means including selective inversion means for selectively inverting the video information content of video lines about an inversion reference level and for not inverting the video information content of other lines, signal distribution means for distributing the output signal produced by said selective inversion means, and means for distributing a measure of said inversion reference level with the composite video signal distributed by said signal distribution means; and signal recovering decrypting means for receiving said composite video signal from said signal distribution means, said decrypting means including inversion reference means for recovering the received inversion reference level, and means for selectively reinverting the video information content of inverted video lines about the recovered inversion reference of said inversion reference means.

2. A combination as in claim 1 wherein said inversion reference distributing means including means for inserting a pulse having an amplitude descriptive of said inversion reference level into the video line horizontal synchronizing pulse intervals.

3. A combination as in claims 1 or 2, wherein said signal originating encrypting means further comprises first binary sequence generating means for controlling said selective inversion means; and wherein said signal recovering decrypting means includes second binary sequence means for controlling said selective reinverting means, and means constraining said second binary sequence means to supply a sequence corresponding to that generated by said first binary sequence generating means.

4. A combination as in claim 3, wherein said first and second binary sequence generator means respectively comprise first and second pseudo random generator means.

5. A combination as in claim 4, wherein said first random generator means includes a shift register having a clock input, plural outputs, exclusive OR logic means connecting selected of said outputs with said clock input, and plural preset input terminals, and further comprising third pseudo random generator means having plural outputs connected to said preset input terminals of said shift register.

6. A combination as in claim 4 further comprising control means for supplying an encryption key digital word controlling said first pseudo random generator means, and wherein said signal distribution means further comprises means for distributing the encription key digital word supplied by said control means.

7. A combination as in claim 6 wherein said signal recovering decrypting means further includes means for receiving said distributed encription key digital word for synchronizing said second binary sequence means with said first binary sequence means.

8. A combination as in claim 6, wherein said control means further includes means for encrypting said encryption key digital word.

9. A combination as in claim 2, wherein said selective inversion means includes operational amplifier means for generating non-inverted and inverted versions of the video information for the array of video lines, and wherein said signal distribution means and information reference level distributing means comprise a reference level source and multiplexing means having inputs connected to said reference level source and to inverting and non-inverting outputs of said operational amplifier means.

10. A combination as in claim 9, wherein said signal originating encription means further comprises timing means for controlling said multiplexer.

11. A combination as in claim 10, further comprising color burst modulating means connected to said multiplexer, and means for supplying audio signal means to said signal distribution means.

12. A combination as in claim 2, wherein said selective reinverting means includes means for generating received and inverted versions of the video information received by said decrypting means, and switch means for passing one or the other of said inverted or non-inverted received program versions therethrough.

13. A combination as in claim 12, wherein said decrypting means further comprise timing means for controlling said switch means.

14. A combination as in claim 12, further comprising means for sampling and storing the received video information during the horizontal synchronizing interval, and additional switch means for operatively blocking said switch means and actuating said additional switch means during the period when said inversion reference pulse is present.

15. A combination as in claim 1 wherein said selective reinverting means comprises first and second transistors each having base, emitter and collector terminals, first resistor means connecting said transistor emitter terminals, second and third resistance means respectively connected to said transistor collector terminals, and means for supplying video and inversion reference signals to said transistor base terminals.

16. In combination in receiver means for receiving encrypted video signals comprising an inversion reference level signalling pulse, and video information selection transmitted either without inversion or inverted about the inversion reference level embodied in said inversion reference level pulse, said selective inversion being dictated by an operative inversion sequence, said receiver means including means for producing non-inverted and reinverted replicas of received video information, said reinverted replica producing means including inverting difference amplifier means responsive to the difference between the received video and the received reference level signalling pulse, first and second switch means having inputs supplied with said non-inverted and reinverted video information replicas and combined outputs, and control means generating said operative inversion sequence for controlling said first and second switches.

17. A combination as in claim 16, wherein said control means comprises a pseudo random generator cycled by received horizontal synchronizing pulses.

18. A combination as in claim 16 or 17, wherein said receiver means further comprises means for deleting said inversion reference level signalling pulses from the output of said first and second switch means.

19. Descrambler apparatus for descrambling an encrypted video signal, said video signal being encrypted by inversion of selected video lines about an inversion reference level, said video signal further including a signal representative of said inversion reference level, said descrambler apparatus comprising inversion reference level storage means responsive to said video signal for providing a signal output representative of said inversion reference level signal contained in said receied video signal; and inversion amplifier means for inverting said selected video lines of said video signal, said inversion amplifier means coupled to said output signal from said reference level storage means for inverting said selected video lines about said stored inversion level reference signal.

20. A combination as in claim 19, wherein said storage means comprises a sample and hold circuit; and wherein the inversion amplifier means comprises a difference amplifier.

* * * * *